United States Patent [19]
Chabala

[11] Patent Number: 5,100,157
[45] Date of Patent: Mar. 31, 1992

[54] SEALING ARRANGEMENT WITH OVERPRESSURE RELIEF

[75] Inventor: Leonard V. Chabala, Maywood, Ill.

[73] Assignee: S&C Electric Company, Chicago, Ill.

[21] Appl. No.: 591,156

[22] Filed: Oct. 1, 1990

[51] Int. Cl.$^5$ .............................................. B65D 51/16
[52] U.S. Cl. ........................................ 277/27; 277/29; 277/73; 277/103; 277/177; 277/206 A; 277/163; 220/207; 220/209
[58] Field of Search ............ 277/27, 28, 29, 73, 277/103, 173, 174, 175, 176, 177, 206 A, 163; 285/95, 101, 918, 924; 220/207, 209, 239; 137/71, 68.1; 116/70, 212, 266, 268, 270, DIG. 70

[56] References Cited

U.S. PATENT DOCUMENTS

| | | | |
|---|---|---|---|
| 2,614,793 | 10/1952 | Storm | 285/918 X |
| 3,337,224 | 8/1967 | Eser, Jr. et al. | 277/163 |
| 4,154,207 | 5/1979 | Brehob | 277/29 X |
| 4,276,990 | 7/1981 | Chiodo | 220/209 |
| 4,549,565 | 10/1985 | Short, III | 137/68.1 X |
| 4,579,041 | 4/1986 | Organ et al. | 277/27 X |
| 4,592,479 | 6/1986 | Resende | 220/209 |
| 4,795,173 | 1/1989 | Osborne | 277/177 |

Primary Examiner—William A. Cuchlinski, Jr.
Assistant Examiner—James K. Folker
Attorney, Agent, or Firm—James V. Lapacek

[57] ABSTRACT

A sealing arrangement is provided with overpressure relief. In the preferred embodiment, the sealing arrangement includes a sealing member that is positioned between two housing portions or the like and that is acted upon by the pressure within the housing. A force-responsive retaining arrangement maintains the sealing member in a predetermined location. Upon the occurrence of overpressures exceeding a predetermined value, the sealing member exerts sufficient force on the force-responsive retaining arrangement so as to cause appropriate displacement of the sealing member to permit the venting of the housing.

14 Claims, 1 Drawing Sheet

SEALING ARRANGEMENT WITH OVERPRESSURE RELIEF

BACKGROUND OF THE INVENTION

1. Field of the Invention

The present invention relates generally to the field of sealing arrangements and more particularly to a sealing arrangement that provides a pressure relief function in the presence of overpressures.

2. Description of the Related Art

Various arrangements are known to provide a seal between two housing parts thereby sealing between the inside of a housing and the outside atmosphere. In typical arrangements, a sealing member is compressed, either directly or indirectly, between two surfaces. For example, see U.S. Pat. No. 4,583,750.

Additionally, overpressure relief arrangements are exemplified in U.S. Pat. Nos. 4,775,849, 3,952,233, 3,733,452, 2,915,674, 3,229,848, 4,229,723, 4,484,247, and 4,102,469. The first three patents utilize a displaceable valve or piston responsive to overpressures. The remainder of these arrangements (and the '452 patent) provide frangible members which are fractured or punctured by overpressure conditions.

While these arrangements may be generally suitable for their intended use, they are complex and/or require independent sealing arrangements and overpressure relief arrangements.

SUMMARY OF THE INVENTION

Accordingly, it is a principal object of the present invention to provide a sealing arrangement wherein a sealing member is responsive to overpressure and serves as a displaceable member for overpressure relief.

It is another object of the present invention to provide an overpressure relief arrangement which utilizes a sealing member that is acted upon by overpressures and a force-responsive retaining arrangement that is displaced by the sealing member in the presence of predetermined overpressures.

These and other objects of the present invention are efficiently achieved by a sealing arrangement with overpressure relief. In the preferred embodiment, the sealing arrangement includes a sealing member that is positioned between two housing portions or the like and that is acted upon by the pressure within the housing. A force-responsive retaining arrangement maintains the sealing member in a predetermined location. Upon the occurrence of overpressures exceeding a predetermined value, the sealing member exerts sufficient force on the force-responsive retaining arrangement so as to cause appropriate displacement of the sealing member to permit the venting of the housing.

BRIEF DESCRIPTION OF THE DRAWING

The invention, both as to its organization and method of operation, together with further objects and advantages thereof, will best be understood by reference to the specification taken in conjunction with the accompanying drawing in which.

DETAILED DESCRIPTION

Figure 1:
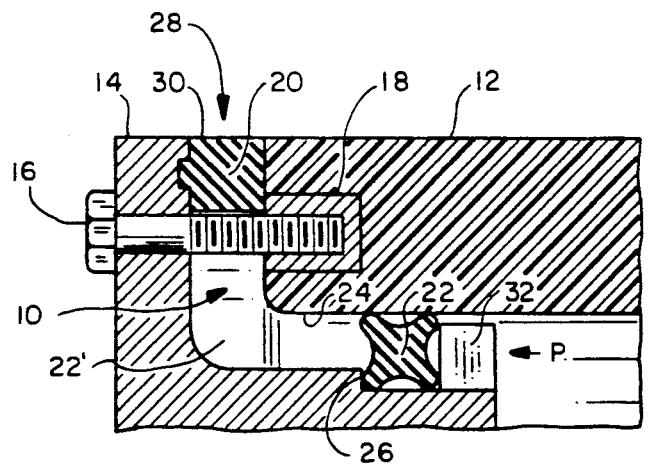
FIGS. 1, 2, and 3 are cut-away views, partly in section, of three respective embodiments of the sealing arrangement of the present invention.

Referring to FIG. 1, the sealing arrangement 10 of the present invention provides a seal between a first housing portion 12 and a second housing portion or end cap 14. For illustrative purposes only, the housing portions 12,14 are generally circular and are assembled via fasteners 16,18 and an intermediate standoff or spacer bushing 20. The sealing arrangement 10 includes a sealing member 22 that is compressed between the housing portions 12,14 which define an annular space or passage 24. In the specific illustration, the sealing member 22 is an annular ring of an elastomeric material. The second housing portion 14 includes an annular ridge or wall 26.

Internal pressure at P within the housing acts upon the sealing member 22. For a range of internal positive pressures up to a predetermined value $P_1$, the sealing member 22 is retained as shown and the seal is maintained. If the pressure P exceeds the value $P_1$, the sealing member 22 is displaced since it functions as an annular piston; i.e., the force on the sealing member 22 overcomes the retention provided by the wall 26. For example, the pressure $P_1$ at which venting occurs may be one or two orders of magnitude greater than the normal internal pressure P. Upon displacement of the sealing member 22 from the position shown in FIG. 1, the sealing member moves through the passage 24. As the sealing member 22 moves to a position where the cross-section of the passage 24 is larger than the cross-section of the sealing member 22, the internal pressure is relieved via venting at 28. The sealing member 22 may be retained at 22' or may be vented with the release of fluid at 28.

It will be apparent from the foregoing that the dimensions of the passage 24 are dictated by the cross-section of the sealing member 22 such that appropriate venting is provided and to ensure that the sealing member 22 does not block the venting of fluid in the passage 24 after the sealing member 22 is displaced past the wall 26.

In the arrangement of FIG. 1, an annular gasket 30 is disposed at the periphery of the passage 24 to provide a weather seal, etc. to the environment. Of course, upon overpressure release, the gasket 30 is displaced, severed, and/or disintegrated to permit the desired venting. Additionally, an aperture ring or a plurality of spacers 32 are provided for embodiments where negative interior pressures may be developed; e.g., where the interior is evacuated prior to filling with a desired fluid for the particular purpose. The ring or spacers 32 serve to prevent the sealing member 22 from being displaced inwardly from the normal position as shown in FIG. 1.

Figure 2:
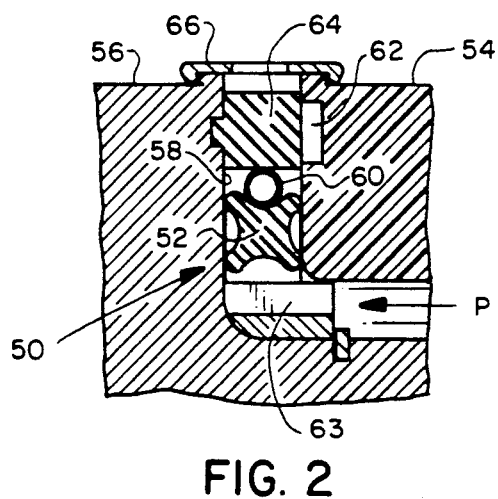

Considering now another embodiment and referring to FIG. 2, the sealing arrangement 50 includes a sealing member 52 compressed between two housing portions 54,56 which are relatively positioned together to define a passage 58. A garter spring 60 is disposed around the periphery of a sealing member 52 so as to retain the sealing member 52 in the sealing position of FIG. 2 under normal conditions. If an overpressure P exceeding $P_1$ should occur, the pressure exerts force on the seal member 52 which is transmitted to the garter spring 60 so as to displace the sealing member 52 and expand the garter spring 60 sufficiently to provide venting of the interior; the sealing member 52 and the garter spring 60 being moved either to the outside of the housing portion 54 or into the widened relief area at 62. Where desired, a spacer or slotted ring 63 is provided to ensure against the movement of the sealing member 52 into the interior. Similarly to the gasket 30 of FIG. 1, a gasket 64 is provided for weather sealing. As shown in FIG. 2, a covering band 66 may also be provided which includes suitable vent holes.

Figure 3:
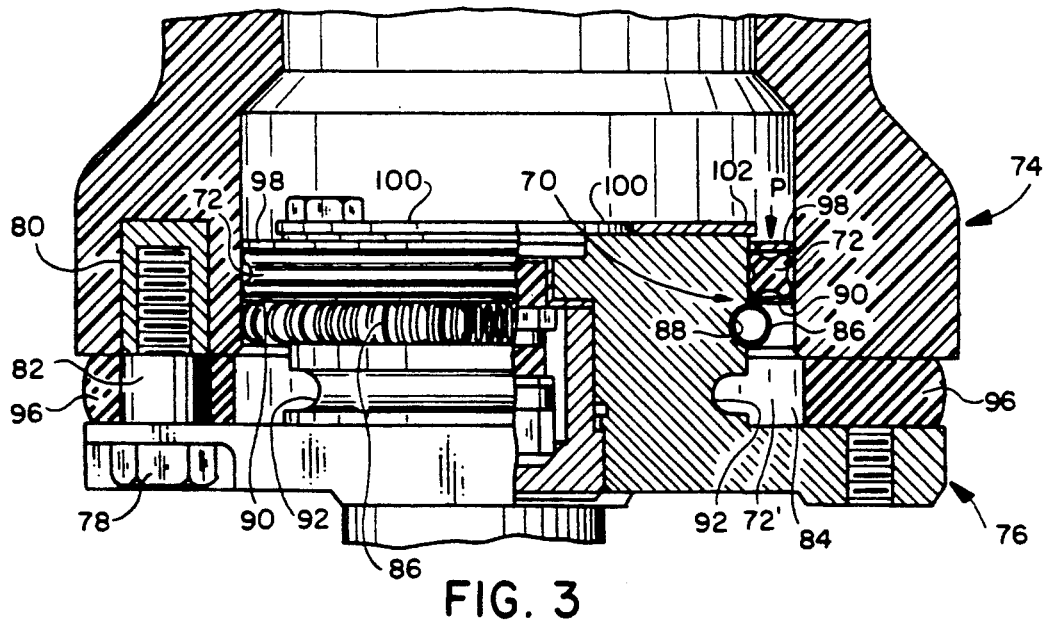

Referring now to a third embodiment in FIG. 3, the sealing arrangement 70 includes a sealing member 72 compressed between two housing portions 74,76 which are fastened together via a threaded bolt 78, a threaded sleeve 90, and a spacer 82. The arrangement is especially adapted to the housing of a gas-filled circuit interrupter. The arrangement defines a passage 84 having both longitudinal and circumferential expanses as shown in FIG. 3. A garter spring 86 is positioned within an annular groove or recess 88 adjacent the sealing member 72. A washer 90 is disposed intermediate the sealing member 72 and the garter spring 86. The washer 90 functions to transmit the force on the sealing member 72 to the garter spring 86 in an efficient and focused fashion. A relief area or groove 92 is provided in the housing portion 76 to provide a defined position for the garter spring 86 upon displacement due to overpressure relief.

Upon the occurrence of sufficient overpressure P in excess of $P_1$, the force on the sealing member 72 displaces the sealing member 72, the washer 90, and the spring 86, with the spring 86 moving rapidly from the position in groove 88 to the groove 92; the washer 90 either fracturing, fragmenting or disintegrating, and the sealing member 72 moving to a position 72' or being vented out the passage 84 at 94. As discussed previously, a gasket 96 similar to gaskets 30 and 64 is provided. To prevent movement of the sealing member 72 into the interior of the housing, a washer 98 and a retaining ring 100 are provided. The retaining ring 100 includes circumferential portions which extend at 102 to a sufficient extent to retain the sealing member 72 in the presence of a predetermine range of negative interior pressures.

Concerning each of the embodiments of FIGS. 1.3, the sealing member is fabricated along with the housing portion to have predetermined dimensions so that the sealing member is suitably compressed to provide a desirable sealing force when assembled. For example, in FIG. 3, the sealing member 72 is fabricated to provide an appropriate interference fit with respect to the housing portions 74,76 when assembled. The sealing member 72 may be lubricated to aid the assembly of the housing portion 76 with supported sealing member 72 into the housing portion 74.

While there have been illustrated and described various embodiments of the present invention, it will be apparent that various changes and modifications will occur to those skilled in the art. For example, it should be specifically understood that the shape of the sealing member and the sealing surface of the housing portion may be any shape as dictated by the particular application and practical considerations. Accordingly, it is intended in the appended claims to cover all such changes and modifications that fall within the true spirit and scope of the present invention.

What is claimed and desired to be secured by Letters Patent of the United States is:

1. A sealing arrangement for a housing including two housing portions comprising:

means for defining a passage between the two housing portions when assembled in a predetermined manner, said passage communicating the interior and the exterior of the housing;

a sealing member being disposed in said passage and being compressed between the two housing portions so as to define a sealing area along said sealing member and across said passage with said sealing member being subject to the pressure internal of the housing acting in a first sense with respect to said sealing member; and retaining means independent of, cooperating with, and adjacent said sealing member for providing a restraining force to said sealing member in response to internal pressure acting in said first sense such that for pressures below a predetermined value the sealing function is uniformly maintained and for permitting abrupt movement of said sealing member in response to internal pressure equal to or in excess of said predetermined value acting on said sealing member in said first sense resulting in overpressure relief via abrupt movement of said sealing member with said passage so as to vent the interior of the housing over substantially the entire sealing area.

2. The sealing arrangement of claim 1 wherein said sealing member is an annular member.

3. The sealing arrangement of claim 1 wherein said retaining means comprises means for defining an upstanding wall adjacent said sealing member.

4. The sealing arrangement of claim 1 wherein said retaining means comprises a spring disposed on the exterior of said sealing member.

5. The sealing arrangement of claim 4 wherein said spring and said sealing member are disposed as annular members, said retaining means further comprising a recess defined within one of the two housing portions for receiving said spring.

6. The sealing arrangement of claim 1 further comprising means for preventing said sealing member from moving toward the interior of the housing in response to negative internal pressures.

7. The sealing arrangement of claim 1 wherein said passage includes a first portion in which said sealing member is disposed and a second portion having a larger expanse than said first portion into which said sealing member passes to vent the interior.

8. The sealing arrangement of claim 7 wherein said expanse of said second portion of said passage is sufficient to permit passage of said sealing member out of said passage and to the exterior of the housing.

9. The sealing arrangement of claim 1 wherein said retaining means comprises first means that is acted upon by said sealing member and that is displaced during the overpressure relief.

10. The sealing arrangement of claim 9 wherein said passage includes means for receiving and retaining said first means during over-pressure relief.

11. The sealing arrangement of claim 1 further comprising means intermediate said sealing member and said retaining means for transmitting forces applied to said sealing member to said retaining means.

12. The sealing arrangement of claim 1 further comprising frangible means disposed in said passage exteriorly of said sealing means for sealing said passage to the exterior, said frangible means becoming disintegral during overpressure relief.

13. A sealing arrangement for a housing including two housing portions comprising:

means for defining a passage between the two housing portions when assembled in a predetermined manner, said passage communicating the interior and the exterior of the housing;

a sealing member being disposed in said passage and being compressed between the two housing portions so as to be subject to the pressure internal of the housing;

retaining means cooperating with and adjacent said sealing member for providing a restraining force to said sealing member, whereby the internal pressure in excess of a predetermined value acting on said sealing member results in overpressure relief via movement of said sealing member within said passage so as to vent the interior of the housing; and frangible means disposed in said passage exteriorly of said sealing means for sealing said passage to the exterior, said frangible means becoming disintegral during overpresure relief.

14. A sealing arrangement for a housing including two housing portions comprising;

means for defining a passage between the two housing portions when assembled in a predetermined manner, said passage communicating the interior and the exterior of the housing;

a sealing member being disposed in said passage and being compressed between the two housing portions so as to define a sealing area along said sealing member and across said passage with said sealing member being subject to the pressure internal of the housing acting in a first sense with respect to said sealing member; and retaining means cooperating with and adjacent said sealing member for providing a restraining force to said sealing member in response to internal pressure acting in said first sense such that for pressures below a predetermined value the sealing function is uniformly maintained, whereby the internal pressure equal to or in excess of said predetermined value acting on said sealing member in said first sense results in overpressure relief via movement of said sealing member within said passage so as to vent the interior of the housing over substantially the entire sealing area, said retaining means comprising first means that is acted upon by said sealing member and that is displaced during the overpressure relief.

* * * * *